United States Patent [19]

Ledger

[11] Patent Number: 5,291,269
[45] Date of Patent: Mar. 1, 1994

[54] APPARATUS AND METHOD FOR PERFORMING THIN FILM LAYER THICKNESS METROLOGY ON A THIN FILM LAYER HAVING SHAPE DEFORMATIONS AND LOCAL SLOPE VARIATIONS

[75] Inventor: Anthony M. Ledger, New Fairfield, Conn.

[73] Assignee: Hughes Aircraft Company, Los Angeles, Calif.

[21] Appl. No.: 906,079

[22] Filed: Jun. 29, 1992

Related U.S. Application Data

[63] Continuation-in-part of Ser. No. 804,872, Dec. 6, 1991.

[51] Int. Cl.$^5$ .................................................. G01B 9/02
[52] U.S. Cl. ..................................... 356/355; 356/357; 356/360
[58] Field of Search ............... 356/345, 355, 357, 359, 356/360

[56] References Cited

U.S. PATENT DOCUMENTS 4,909,631  3/1990  Tan et al. ............................ 356/382
5,042,949  8/1991  Greenberg et al. .................. 356/359

*Primary Examiner*—Samuel A. Turner
*Assistant Examiner*—Robert Kim
*Attorney, Agent, or Firm*—Michael W. Sales; Wanda K. Denson-Low

[57] ABSTRACT

An apparatus (1) that measures the thickness of a thin film layer of a wafer (24), includes an extended light source that forms a diffuse polychromatic light beam. The extended light source includes a halogen lamp (10), a fiber optic light guide (12), a ground glass screen (19), and a condenser lens (16). The diffuse polychromatic light beam generated by this extended light source illuminates an entire surface of the wafer (24). The diffuse polychromatic light beam is reflected off the wafer (24) and passed through a spatial filter (26, 28) and a spectral filter (37, 38) so as to form a monochromatic light beam that is projected onto a detector array (31) of a charge coupled device (CCD) camera (30). The monochromatic light beam displays an interference fringe pattern image on the CCD camera detector array (31) which is the result of coherent interactions in the diffuse polychromatic light beam as it is reflected within the wafer structure (24). The interference fringe pattern image displayed on the CCD camera detector array (31) is captured by the CCD camera (30). The captured image is then converted to a map of measured reflectance data by a digitizing circuit (34) and a computer (36). This map of measured reflectance data is then compared to reference reflectance data to generate a map of the thin film layer thickness over a full aperture of the wafer (24).

48 Claims, 6 Drawing Sheets

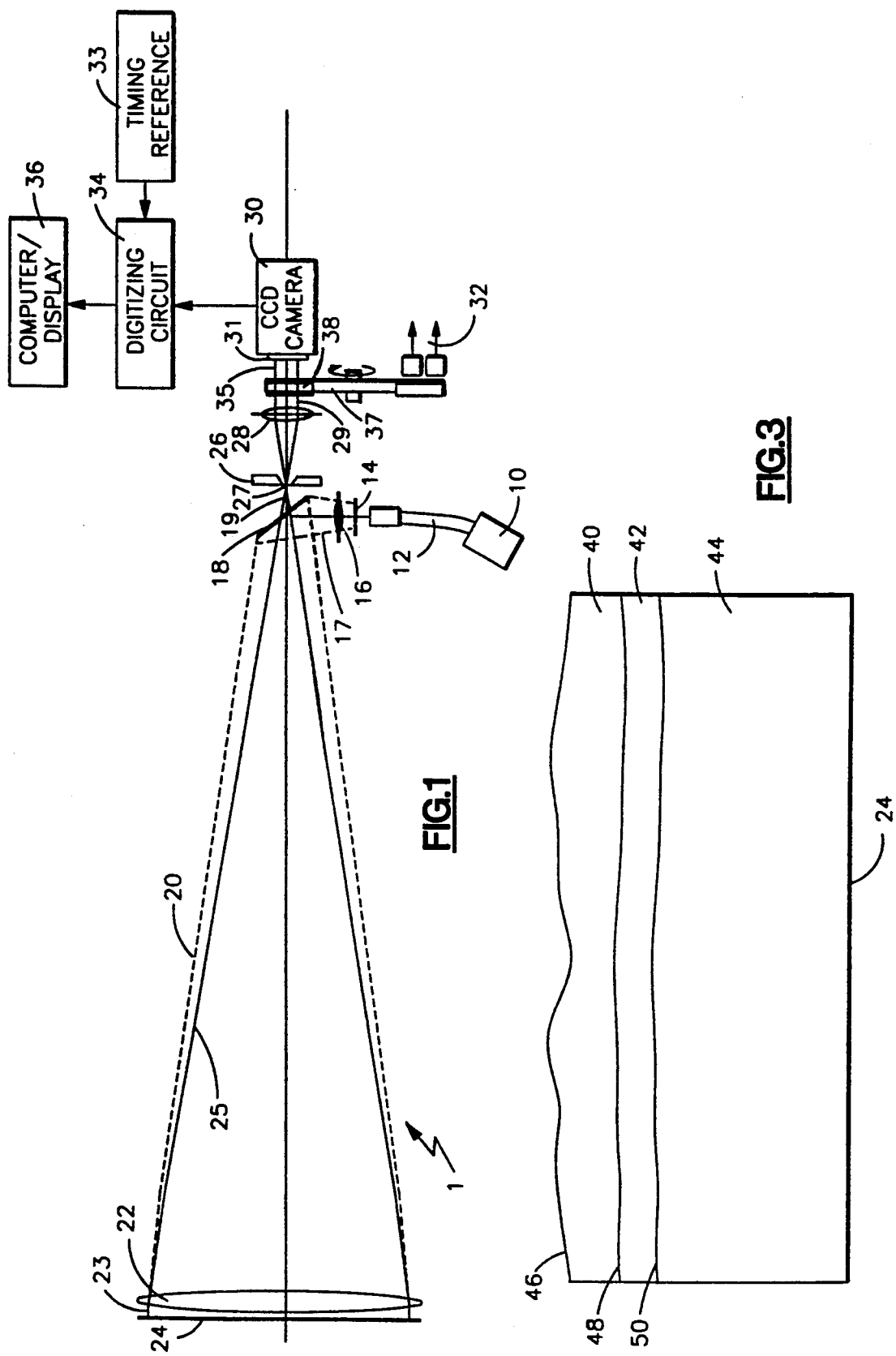

APPARATUS AND METHOD FOR PERFORMING THIN FILM LAYER THICKNESS METROLOGY ON A THIN FILM LAYER HAVING SHAPE DEFORMATIONS AND LOCAL SLOPE VARIATIONS

CROSS-REFERENCE TO RELATED APPLICATIONS

This application is a continuation-in-part application of U.S. patent application Ser. No. 07/804,872, entitled, Apparatus and Method for Measuring the Thickness of Thin Films, filed on Dec. 6, 1991, now pending and assigned to the assignee hereof.

BACKGROUND OF THE INVENTION

1. Field of the Invention

The present invention relates to an apparatus and method for performing thin film layer thickness metrology and, more particularly, to an apparatus and method for performing thin film layer thickness metrology on a silicon/silicon dioxide/silicon (Si/SiO$_2$/Si) structured semiconductor wafer by illuminating the wafer with a diffuse light source.

2. Description of the Prior Art

In one particular application wherein the present invention is especially practical, a silicon-on-insulator (SOI) semiconductor wafer, typically consisting of an Si/SiO$_2$/Si sandwich structure, is fabricated by growing a silicon dioxide (SiO$_2$) film on one surface of each of two silicon (Si) wafers and bonding the two silicon dioxide film surfaces together at high temperature. This fabrication process usually results in deformations in the shape of the SOI wafer that typically range from 50 to 100 microns. The SOI wafer then undergoes further fabrication processing, wherein an outer surface of one of the two silicon wafers in the sandwich structure is mechanically ground and polished to an average thickness of several microns. This mechanical grinding and polishing unfortunately results in large spatial variations in the thickness of this one silicon wafer, or this one outer silicon layer. These spatial variations can result in local slope variations of up to ¼ of a degree along the surface of this outer silicon layer. To reduce these spatial variations, a thickness error map that indicates thickness non-uniformities in this outer silicon layer over the entire wafer surface is required, for example, to initialize a subsequent micropolishing process.

A sequence of measuring the spatial variations in the thickness of the outer silicon layer followed by thinning and smoothing the surface of this layer by micropolishing may need to be performed several times before the entire outer silicon layer achieves a desired thickness. In order to reduce costs and increase production, a measurement of at least 400 points on a wafer surface in 60 seconds is desirable.

Current commercial instruments, however, can typically provide a thickness measurement of a thin film layer at only a single point thereon. These instruments use a focused lens or a fiber bundle to locally illuminate a surface of the thin film layer with a beam of monochromatic light, and a grating or prism spectrograph to measure the surface spectral reflectance at each point. In all cases, this surface spectral reflectance data must be numerically corrected due to variations in the angle of incidence caused by the f-,, number of the illuminating beam.

These current commercial instruments may be extended to cover an entire thin film layer, such as an outer silicon layer of an SOI semiconductor wafer, by moving either the measuring instrument or the wafer in a controlled manner. However, the time required for these instruments to determine the thickness of an outer silicon layer of an SOI semiconductor wafer at a single point thereon is on the order of several minutes, and characterizing the entire outer silicon layer with at least 400 measurement points far exceeds the time desired for efficient wafer production. It is therefore desirable to perform thin film layer thickness metrology over an entire thin film layer, such as an entire outer silicon layer of an SOI semiconductor wafer, in an efficient, albeit an economical and highly accurate manner.

SUMMARY OF THE INVENTION

The present invention contemplates an apparatus and method for efficiently determining a thin film layer thickness of, for example, an entire thin film layer of a semiconductor wafer. Non-uniformities in the thickness of this thin film layer are obtained by measuring the reflectance characteristics of a surface of the wafer over its full aperture, and comparing this measured reflectance data to reference reflectance data by using numerical iteration or by using a calibration wafer having known thin film layer thicknesses.

To efficiently measure the reflectance characteristics over a full aperture of a semiconductor wafer surface, a diffuse illumination scheme is used to produce a beam of polychromatic light having a wide range of angles. This diffuse polychromatic light beam is projected onto an entire surface of the wafer, resulting in coherent interactions in this light as it is reflected between material layer surfaces within the wafer structure. In contrast to the methods used in the previously referenced U.S. patent application Ser. No. 07/804,872, wherein either spatially filtered monochromatic light or spatially filtered polychromatic light is projected onto an entire wafer surface, the present invention provides spatial filtering to the polychromatic light beam only after it has been reflected from the wafer surface. This diffuse illumination scheme allows light to be reflected from every point on the wafer surface (including all points on the material layer surfaces within the wafer structure) and passed by an on-axis spatial filter regardless of any wafer shape deformations or any wafer surface local slope variations.

After the polychromatic light beam is reflected from the wafer surface and passed through the on-axis spatial filter, it is then passed through a series of narrow band filters. These series of narrow band filters produce a series of spatially filtered monochromatic light beams that are projected onto a detector array of a charge coupled device (CCD) camera. Due to the coherent interactions in the polychromatic light as it is reflected between the material layer surfaces within the wafer structure, a series of monochromatic images of interference fringe patterns are formed on the CCD camera detector array. Each interference fringe pattern image is then captured in full aperture by the CCD camera.

The interference fringe pattern images are captured by digitizing pixels in the CCD camera detector array that correspond to each projected interference fringe pattern image present. A reflectance map of the entire wafer surface is then generated from this captured interference fringe pattern image. Several reflectance maps are generated from each measured wafer to eliminate thickness ambiguities which can result from thin film layers having phase thicknesses greater than $2\pi$.

The reference reflectance data for a wafer can be obtained theoretically or through the use of a calibration wafer. The theoretical method consists of numerically computing reference reflectance characteristics based on assumed values for the intrinsic optical properties of the wafer materials. Alternatively, a calibration wafer, having a known thin film layer thickness profile, can be fabricated from the same batch of materials used to fabricate the wafer to be measured. By subjecting this calibration wafer to the measuring method of the present invention, reference reflectance data is accurately obtained.

The comparison between the measured reflectance data and the reference reflectance data is performed by a computer. Upon performing this comparison, the computer provides a mapping of thin film layer thicknesses or a mapping of thin film layer thickness non-uniformities over the full aperture of the wafer.

A primary objective of the present invention is to provide an efficient means for measuring thin film layer thicknesses.

Other objects and advantages of the present invention will become apparent to those skilled in the art from the following detailed description read in conjunction with the appended claims and the drawings attached hereto.

BRIEF DESCRIPTION OF THE DRAWINGS

FIG. 1 is a schematic representation of semiconductor wafer thin film layer thickness measuring instrument using a large collimator lens according to the present invention.

FIG. 3 is a greatly enlarged illustration of the various layers of an SOI semiconductor wafer.

DETAILED DESCRIPTION OF THE INVENTION

Figure 2A:
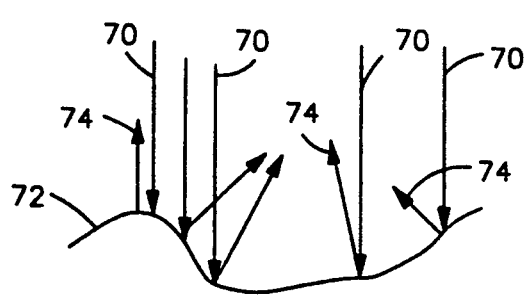
FIG. 2a is an illustration of spatially filtered illumination incident upon a wafer that is deformed in shape and has local slope variations along its surface.

Referring to FIG. 1, there is shown an apparatus, generally indicated by the numeral 1, for measuring a thin film layer thickness of a semiconductor wafer 24. For the purposes of this description, the thickness measurement of an outer silicon layer thickness of an SOI semiconductor wafer 24 is described. Assume that this SOI semiconductor wafer 24 is deformed in shape and has local slope variations along its outer silicon layer surface as well as along any material layer surfaces within the SOI wafer structure 24.

The apparatus 1 maintains a diffuse source that includes a ground glass screen 14 that is illuminated by white light from a halogen lamp 10 through a fiber optic light guide 12. The ground glass screen 14 scatters the white light, or polychromatic light, and a condenser lens 16 projects a diffuse polychromatic light beam 17 toward a thin Plate beam splitter 18. The range of angles in the diffuse polychromatic light beam 17 are defined by the diameter of the condenser lens 16 and the distance to the wafer 24, and larger distortion angles can be provided by auxiliary light sources if required.

The thin plate beam splitter 18 reflects a portion 20 of the diffuse polychromatic light beam 17 toward a first collimator lens 22 that is positioned in front of the SOI wafer 24. The first collimator lens 22 transforms the diverging diffuse polychromatic light beam 20 into a collimated diffuse polychromatic light beam 23 that illuminates the full aperture of the SOI semiconductor wafer 24. This collimated diffuse polychromatic light beam 23 is reflected from the SOI wafer 24 and back through the first collimator lens 22 to form a converging diffuse polychromatic light beam 25 that is directed back toward the thin plate beam splitter 18. The thin plate beam splitter 18 transmits a portion 19 of the converging diffuse polychromatic light beam 25 toward a plate 26 having a circular aperture 27 followed by a second collimator lens 28. The plate 26 and second collimator lens 28 form a spatial filter that transforms the transmitted converging diffuse polychromatic light beam 19 into a collimated spatially filtered polychromatic light beam 29.

The collimated diffuse polychromatic light beam 23 that illuminates the full aperture of the SOI wafer 34 contains a wide range of angles. In comparison, the method described in the previously referenced U.S. patent application Ser. No. 07/804,872, illuminated a full aperture of an SOI wafer with a collimated spatially filtered monochromatic light beam or a collimated spatially filtered polychromatic light beam, both having a narrow range of angles. The use of the diffuse beam 23 as opposed to a spatially filtered beam allows significantly more light to be reflected from the SOI wafer 24 at an angle to be passed by the spatial filter 26, 28 when the wafer is deformed in shape or has local slope variations along its surface, which is generally the case. This concept is illustrated in FIG. 2.

Referring to FIG. 2a, there is shown a group of incoming rays 70 from a collimated spatially filtered polychromatic light beam or a collimated spatially filtered monochromatic light beam that are incident upon an SOI wafer surface 72 that is deformed in shape and has local slope variations. The incoming rays 70 are shown to be reflected from the wafer surface 72, thereby producing a group of outgoing rays 74. Due to the wafer surface 72 shape deformations and local slope variations, the outgoing rays 74 have a wide range of angles, many of which would not be passed by a spatial filter.

Figure 2B:
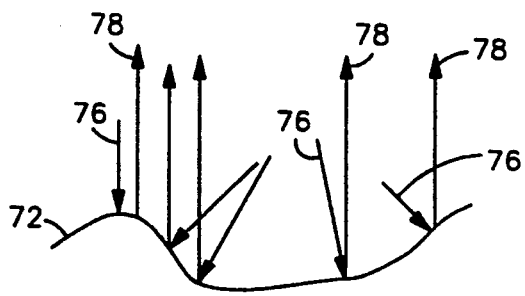
FIG. 2b is an illustration of diffuse illumination incident upon a wafer that is deformed in shape and has local slope variations along its surface.

Referring to FIG. 2b, however, there is shown, according to the present invention, a group of incoming rays 76 from a collimated diffuse polychromatic light beam 23 that are incident upon the same SOI wafer surface 72 that is deformed in shape and has local slope variations. These incoming rays 76 are reflected from the wafer surface 72, thereby producing a group of outgoing rays 78. These outgoing rays 78 have a narrow range of angles that will be passed by the spatial filter 26, 28 despite the wafer surface 72 shape deformations and local slope variations.

Of course, not all of the rays contained in the collimated diffuse polychromatic light beam 23 are reflected in the manner illustrated in FIG. 2. However, as opposed to a collimated spatially filtered light beam, the collimated diffuse polychromatic light beam 23 allows significantly more light to be reflected from the wafer surface 72 at an angle to be passed by the spatial filter 26, 28. As will be shown, the amount of light reflected from the wafer surface 72 and passed by the spatial filter 26, 28 is critical to the accuracy of the thin film layer thickness measurement. It should be noted, that the concept shown in FIGS. 2a and 2b applies to an external wafer surface as well as an internal wafer layer surface.

Referring to FIG. 3, an SOI semiconductor wafer 24 is shown constructed in a sandwich structure with a mechanically polished outer silicon layer 40, an internal silicon dioxide ($SiO_2$) film 42, and a silicon wafer substrate 44. This sandwich structure creates three interfaces 46, 48, 50 from which light, incident upon the outer silicon layer 40, may be reflected. The reflectance characteristics of these interfaces 46, 48, 50 are based upon the intrinsic optical and physical properties of the materials in each layer 40, 42, 44 of the SOI wafer 24. These properties comprise the absorption coefficient ($\alpha$), the index of refraction (n), and the thickness (t) of the material layers 40, 42, 44. For an SOI wafer, it is assumed that the absorption coefficient ($\alpha_1$) of the $SiO_2$ layer 42 is zero. However, in general, it is permissible that the absorption coefficient of the $SiO_2$ layer 42 be non-zero, provided that it is known.

When an SOI wafer 24 such as that described in FIG. 3 is installed in the apparatus 1 of FIG. 1, and the surface 46 of this SOI wafer 24 is illuminated with the collimated diffuse polychromatic light beam 25, a series of coherent interactions occur as this light is reflected between the three material interfaces 46, 48, 50 of the SOI wafer structure 24. These interactions produce wavelength dependent interference fringe pattern images that are contained in the collimated diffuse polychromatic light beam 25 that is reflected back through the first collimator lens 22 and toward the thin plate beam splitter 18. The reflectance at any point on the wafer is determined by the multiple reflections between the three interfaces 46, 48, 50 and by the magnitudes of their physical properties ($n_1, \alpha_1, t_1, n_2, \alpha_2, t_2, n_3, \alpha_3$). In the unique case of the SOI wafer 24 structure, the substrate 44 indices ($n_3, \alpha_3$) are identical to those of the outer silicon layer 40 indices ($n_2, \alpha_2$) since both are fabricated from single crystal silicon.

The wafer reflectance at any wavelength can be calculated explicitly as a function of the outer silicon layer thickness ($t_2$) if all the other parameters are known. However, the reverse problem of computing the thickness ($t_2$) from a single measured reflectance is ambiguous. This ambiguity is created by the fact that as the outer silicon layer thickness ($t_2$) is increased, the measured reflectance cycles between maximum and minimum values as the phase thickness ($n_2 t_2$) increases by multiples of $\pi/4$. This multiple values problem clearly makes the computation of the value of $t_2$ from a single reflectance measurement impossible. The use of multiple wavelength measurements can in principle overcome the multiple values problem, but the wavelength dependent behavior of the material properties must be very accurately known or otherwise large errors can occur in the thickness computations.

An alternate approach for overcoming the multiple values problem is a statistical one, wherein measured reflectance data at several wavelengths is compared on a least squares best fit basis with a library of computed spectral data at the same wavelengths. In the case of an SOI wafer, the library of spectra is computed for all values of the outer silicon layer thickness ($t_2$) and the selection is made by choosing that outer silicon layer thickness which minimizes the least squares best fit.

Referring again to FIG. 1, the collimated spatially filtered polychromatic light beam 29 also contains wavelength dependent interference fringe pattern images due to the coherent interactions in the SOI wafer structure 24, as described. This collimated spatially filtered polychromatic light beam 29 is spec&&y filtered by a series of narrow band filters 38 nominally of 30 to 50 Å half bandwidth. The series of filters 38 are placed around the periphery of a rotating filter wheel assembly 37, whereby a corresponding series of collimated monochromatic light beams 35 are produced. The wavelengths of these collimated monochromatic light beams 35 typically range from 550 nm to 950 nm. Locating the filter wheel assembly 37 in the path of the collimated beam 29 minimizes any spectral broadening in the filtered beam 35 that can be caused by the field angle defined by the size, of the aperture 27. A pair of electronic signals 32 are generated by the filter wheel assembly 37 to serve as a timing reference 33 for a digitizing circuit 34. One of these signals indicates the beginning of a filter wheel revolution, whereas the other signal indicates the beginning of each filter period. Each of the collimated monochromatic light beams 35 is directed onto a CCD camera detector array 31 where the wavelength dependent interference fringe pattern image contained in each reflected monochromatic light beam 35 is displayed.

Figure 4:
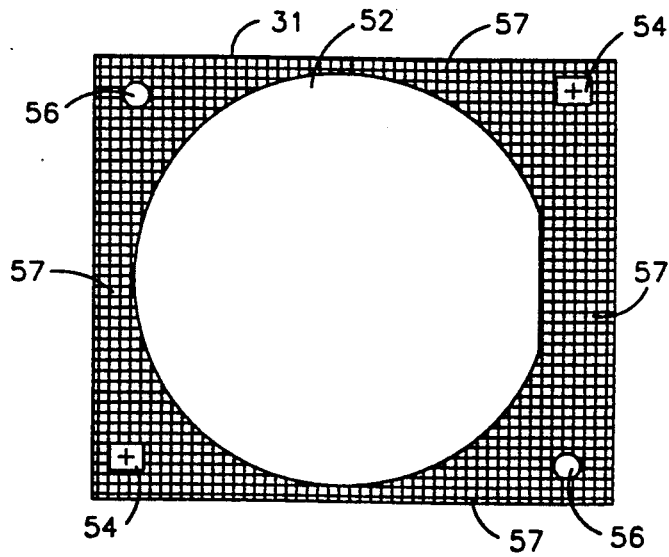
FIG. 4 is a plan view of a CCD camera detector array showing a wafer image outline and several reference surface image outlines.

Referring to FIG. 4, the CCD camera detector array 31 is shown with an SOI wafer image outline 52, a pair of reference alignment image outlines 54, and a pair of reference reflectance image outlines 56, projected upon its surface. These reference images 54, 56 are formed by placing reference alignment marks and reference reflectance surfaces along the same plane as the surface of the SOI wafer 24. When illuminated with the collimated polychromatic light beam 23 from the first collimator lens 22, these references provide reflections from their surfaces. Similar to the SOI wafer wavelength dependent interference fringe pattern images, images of these references are contained in the reflected collimated polychromatic light beam 25, whereby they are eventually projected onto the CCD camera detector array 31. The reference alignment marks provide aid in wafer alignment, whereas the reference reflectance surfaces serve to normalize the CCD signals so that actual wafer reflectance can be calculated. As shown, the CCD detector array 31 is made up of a plurality of CCD pixels 57.

Referring back to FIG. 1, the wavelength dependent interference fringe pattern image that is displayed on the CCD camera detector array 31 is captured by the CCD camera 30. A reflectance map is generated by digitizing the CCD pixels 57 that correspond to each displayed wavelength dependent interference fringe pattern image through the use of a digitizing circuit 34. This raw reflectance data can be normalized to eliminate variations in CCD pixel sensitivity and can be reduced in size by averaging signals from several CCD pixels 57 to match the spatial limitations of any subsequent chemical micropolishing process. Any normalization or reduction of the raw reflectance data is typically performed by a computer 36, as is the method for determining the thickness ($t_2$) of the outer silicon layer 40. The computer 36 can also be used to display digitized interference fringe pattern images captured by the CCD camera 30. The resolution of such a digitized image display reveals the accuracy of which a thin film layer thickness measurement can be made.

As mentioned previously, the amount of light reflected from the wafer 24 and passed by the spatial filter 26, 28 is critical to the accuracy of the thin film layer thickness measurement. This concept is illustrated in FIGS. 5, 6, and 7 wherein CCD camera 30 captured digitized interference fringe pattern images are shown for various types of illumination of an SOI wafer that 24 is deformed in shape and has local slope variations along its surface.

Figure 5:
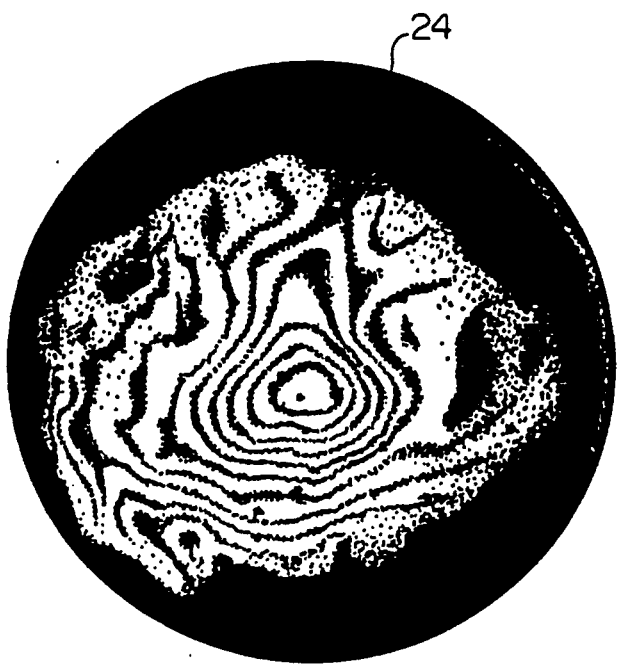
FIG. 5 is an illustration of a CCD camera captured digitized interference fringe pattern image of an SOI wafer illuminated with spatially filtered light.

FIG. 5 shows an image which is the result of a spatially filtered illumination. This type of illumination could be performed by replacing the ground glass screen 14 and condenser lens 16 in FIG. 1 with a condenser lens and an apertured plate, respectively. Notice the severe vignetting of image due to a combination of the shape deformations and local slope variations of the wafer 24 and a loss of spatially filtered light reflected from the wafer 24. This type of illumination was illustrated in FIG. 2a.

Figure 6:
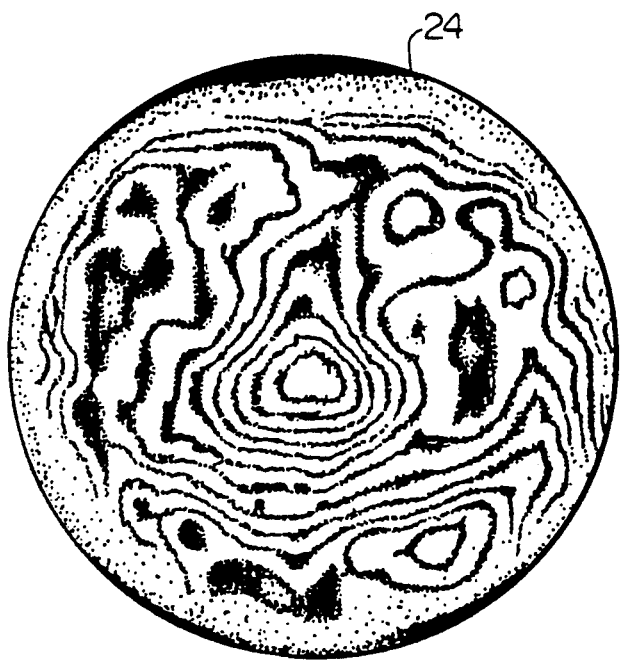
FIG. 6 is an illustration of a CCD camera captured digitized interference fringe pattern image of an SOI wafer illuminated with spatially filtered light while being flattened by a vacuum chuck.

FIG. 6 also shows an image resulting from a spatially filtered illumination, but with the wafer 24 flattened by a vacuum chuck to eliminate wafer shape deformations. This image is significantly improved from the image in FIG. 5, but vignetting is still evident around its edges due to local slope variations.

Figure 7:
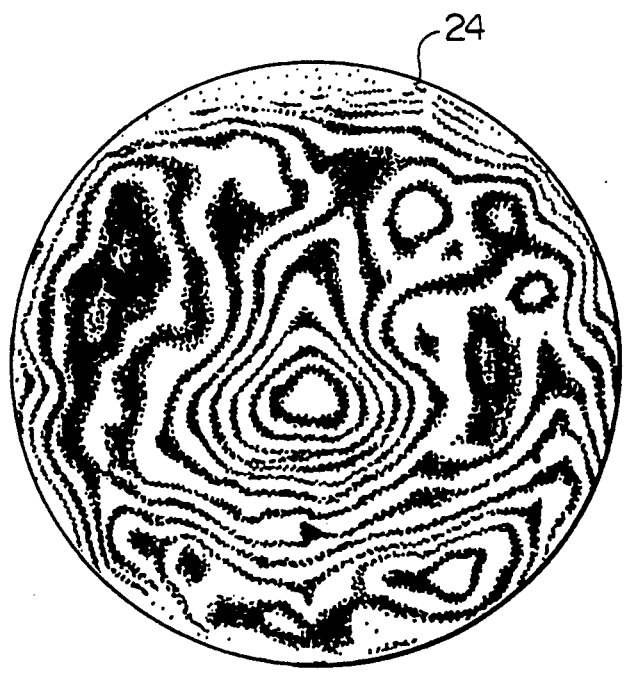
FIG. 7 is an illustration of a CCD camera captured z& interference fringe pattern image of an SOI wafer illuminated with diffuse light according to the present invention.

FIG. 7 shows an image resulting from the diffuse illumination scheme according to the present invention. This image was taken when the wafer 24 was free to take its natural shape (i.e. no vacuum chuck flattening). In this case, the edges are well defined and the image is of higher resolution than the CCD camera 30. Thus, a thin film layer thickness measurement can be made with very high accuracy.

In determining the thickness ($t_2$) of the outer silicon layer 40 of the SOI wafer 24, either a numerical computation method or a SOI calibration wafer may be used. The numerical method of determining outer silicon layer thickness ($t_2$) includes assuming values for the thin film constants $n_1$, $\alpha_1$, $t_1$, $n_2$, $\alpha_2$, $n_3$, and $\alpha_3$, and calculating spectral reflectances for a set of wavelengths corresponding to the collimated monochromatic light produced by the narrow band filters 38 in the rotating filter wheel 37. This calculation is done for a number of different outer silicon layer thicknesses ($t_2$) and, provided that the initial thin film constant assumptions are correct, should only need to be computed once. This calculation provides sets of reflectance values, $R_c(\lambda_1, \lambda_2, \ldots \lambda_n, t_2)$, for thicknesses ranging from the thinnest to the thickest estimated value of the outer silicon layer. These computed spectral reflectance are then compared with the measured reflectance data, $R_m(x,y,\lambda_n)$, at specific points on the wafer using a root mean square (rms) merit function of the form, $$M(x, y, t_2) = \left[\frac{1}{n\max}\left[\sum_{n=1}^{n\max}[R_m(x, y, \lambda_n) - R_c(\lambda_n, t_2)]^2\right]\right]^{\frac{1}{2}}$$

This merit function is evaluated for different values of $t_2$ until a minimum or best match is found, which in turn indicates the most likely thickness. Of course, other pattern matching merit functions can be used if desired.

Unknown variations in any of the assumed thin film constants may cause errors to propagate through the computation process as outer silicon layer thickness errors. Such first order error sources include the lack of knowledge of the thickness ($t_1$) of the $SiO_2$ layer 42 over the wafer aperture and the dispersive effects of the silicon index of refraction ($n_1$). If the value of the merit function is too large, indicating a poor match, then new computed spectral reflectances will have to be generated for a closer set of $t_2$ thicknesses, iterated with the absorption coefficients ($\alpha_2, \alpha_3$) and the indices of refraction ($n_2, n_3$) of the outer silicon layer 40 and the silicon substrate 44, respectively, or the index of refraction ($n_1$) and the thickness ($t_1$) of the $SiO_2$ layer 42.

Figure 8:
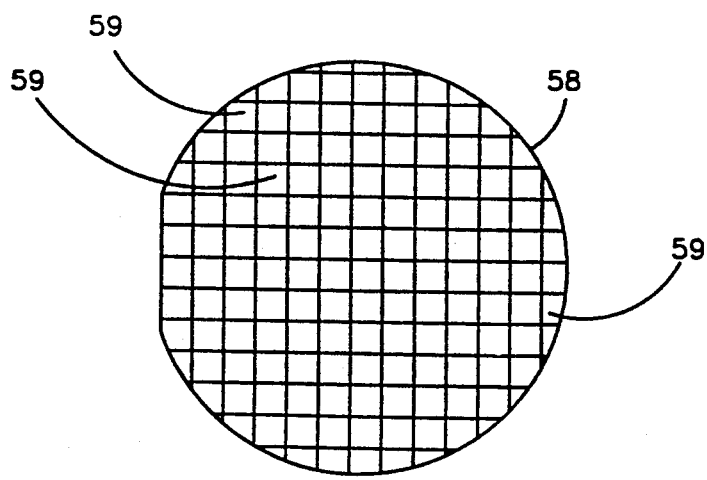
FIG. 8 is a plan view of an SOI semiconductor calibration wafer having a stepped outer silicon layer surface.

The second method of determining outer silicon layer thickness is to generate a set of spectral reflectances from an SOI calibration wafer 58 having a stepped outer surface, as shown in FIG. 8, wherein each square area 59 of the wafer has a different known outer silicon layer thickness. It is preferred that the wafer have at least 500 reference squares to cover the likely range of outer silicon layer thicknesses. This wafer 58 can be calibrated for outer silicon layer thicknesses down to zero silicon thickness by using a stylus profilometer. The calibration wafer 58 is manufactured from the same batch of materials and is subject to the same manufacturing conditions as the wafer 24 under measurement. Consequently, the intrinsic optical properties of the calibration wafer such as the absorption coefficient and the index of refraction, and also the dispersive behavior should match those of the wafer 24 being tested.

The spectral reflectances of the calibration wafer 58 are obtained by subjecting this wafer to the measuring method of the present invention. These spectral reflectances are stored in the computer 36 and are used as a reference for comparison with the spectral reflectances of a measured SOI wafer 24. The calibration wafer 58 has reference reflectances for at least 500 different outer silicon layer thicknesses and the reference reflectance that most closely matches the reflectance at any point on the surface of the measured SOI wafer 24 indicates the outer silicon layer thickness at that point.

Although both of these methods meet the objective of providing a 400 point measurement of outer silicon layer thickness in less than 60 seconds, the calibration wafer method is potentially more accurate than the numerical approach due to the similarity of the intrinsic optical properties between the calibration wafer 58 and the SOI wafer 24 to be measured. However, the calibration wafer method would require on-line production capability to generate a new calibration wafer 58 if the basic wafer process is significantly altered.

Figure 9:
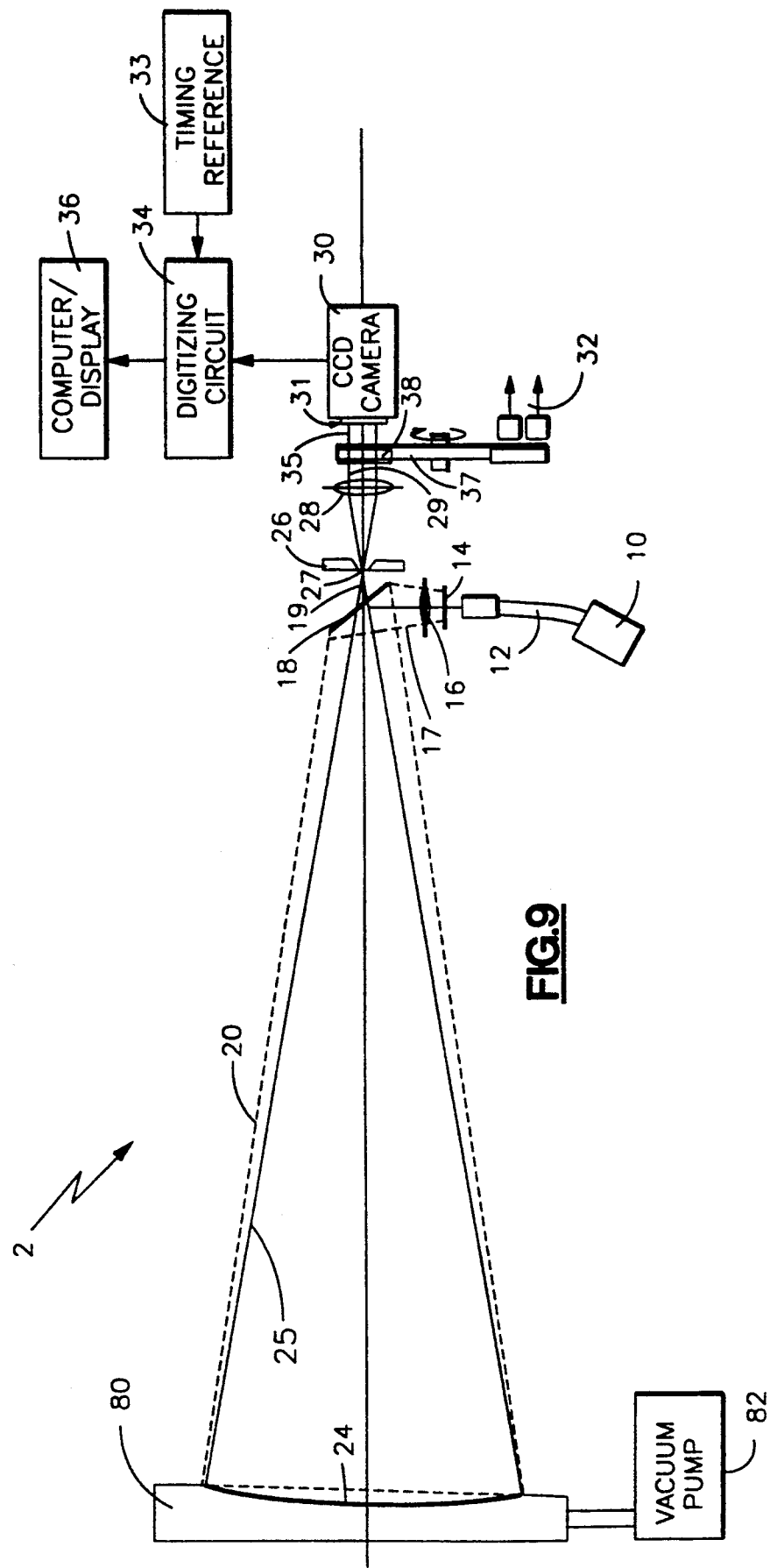
FIG. 9 is a schematic representation of a semiconductor wafer thin film layer thickness measuring instrument using a spherically shaped vacuum chuck according to the present invention.

Using basically the same method of measuring the thickness of a thin film layer as described for the apparatus 1 in FIG. 1, there exist alternate methods for illuminating the SOI wafer 24. FIG. 9 shows an apparatus, generally indicated by the numeral 2, wherein the wafer 24 is deformed into a reflective condenser. This deformation method is thoroughly described in the related and co-pending U.S. patent application Ser. No. 07/891,344, entitled, Apparatus and Method for Performing Thin Film Layer Thickness Metrology By Deforming a Thin Film Layer Into a Reflective Condenser, filed May 29, 1992, assigned to the assignee hereof, and hereby incorporated by reference. For the purposes of the present invention, using such a wafer deformation method removes the need for the large and somewhat costly first collimator lens 22 as shown in FIG. 1. Briefly, the wafer 24 is deformed into a reflective condenser as it adheres to a vacuum chuck 80 to which a vacuum pump 82 creates a suction. AU other aspects of the apparatus 2 shown in FIG. 9 are identical to the apparatus 1 shown in FIG. 1, and are therefore numerically identified as such.

Figure 10:
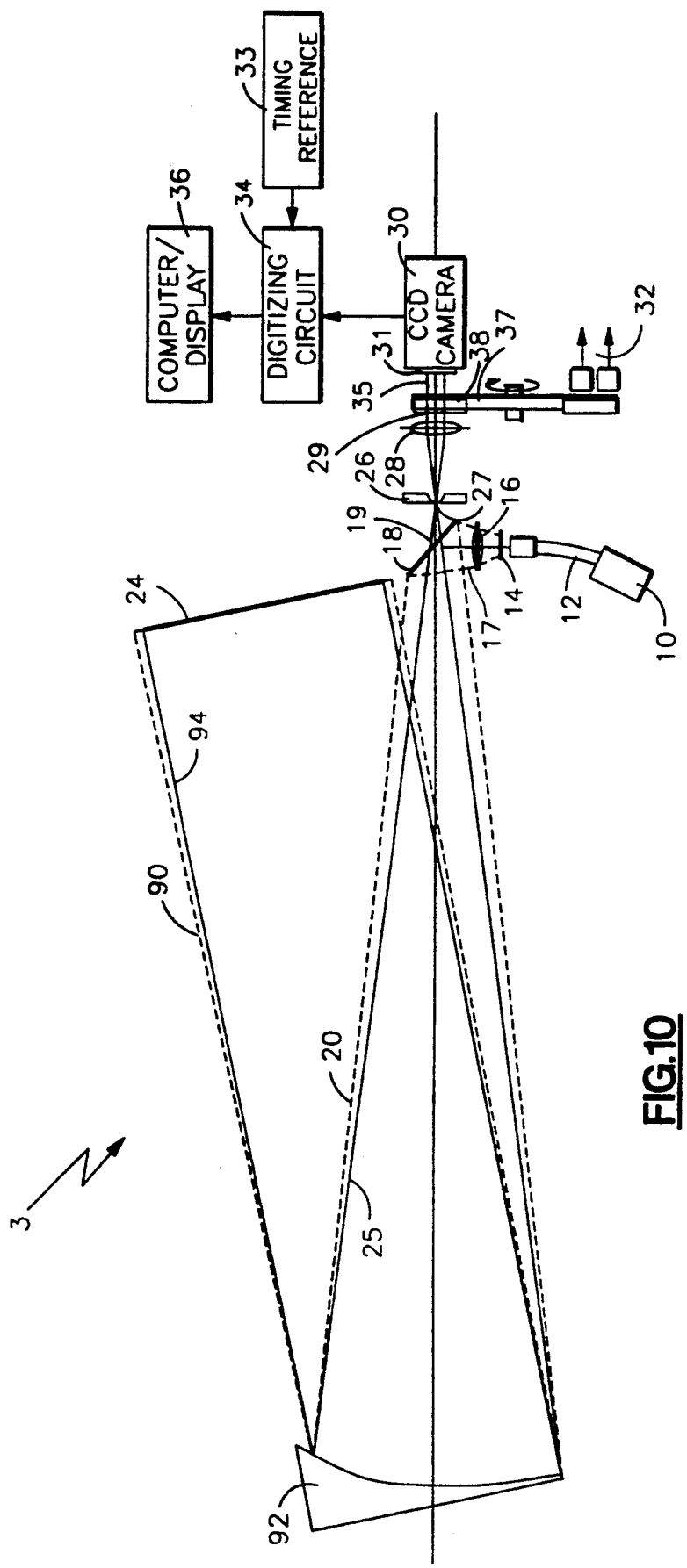
FIG. 10 is a schematic representation of a semiconductor wafer thin film layer thickness measuring instrument using a parabolic reflector according to the present invention.

FIG. 10 shows an apparatus, generally indicated by the numeral 3, wherein the wafer 24 is illuminated with a collimated diffuse polychromatic light beam 90 that is reflected from a reflective parabolic collimator 92. Such a method also removes the need for the large and somewhat costly first collimator lens 22 as shown in FIG. 1. The wafer 24 reflects the collimated diffuse polychromatic light beam 92 and a reflected collimated diffuse polychromatic light beam 94 is directed from the wafer 24 back toward the parabolic reflector 92. All other aspects of the apparatus 3 shown in FIG. 10 are identical to the apparatus 1 shown in FIG. 1, and are therefore numerically identified as such.

It is thus seen that the objectives set forth above are efficiently attained and, since certain changes can be made in the above described apparatuses and methods without departing from the scope of the invention, it is intended that all matter contained in the above description or shown in the accompanying drawings shall be interpreted as illustrative and not in a limiting sense.

What is claimed is:

1. An apparatus for measuring the thickness of a layer of material having a front and a rear surface, wherein said material of said layer has a property that allows radiation to be transmitted therethrough, said apparatus comprising:
   means for irradiating said front surface of said layer of material with polychromatic radiation, wherein said polychromatic radiation is reflected from said front and rear surfaces of said layer of material having characteristics that correspond to the thickness of said layer of material;
   means for filtering said reflected polychromatic radiation so as to produce monochromatic radiation having characteristics that correspond to the thickness of said layer of material;
   means for receiving said filtered monochromatic radiation and for detecting said characteristics; and
   means for comparing said detected characteristics of said received filtered monochromatic radiation with a set of reference characteristics that correspond to known thicknesses and for providing an output that corresponds to the thickness of said layer of material.

2. The apparatus as defined in claim 1, wherein said means for irradiating comprises means for irradiating said front surface of said layer of material with visible light.

3. The apparatus as defined in claim 2, wherein said means for irradiating with visible light comprises means for irradiating said front surface with visible polychromatic light having a plurality of wavelengths, such that ambiguities, arising when the phase thickness of said layer of material is a multiple of one of said plurality of wavelengths, are eliminated.

4. The apparatus as defined in claim 3, wherein said means for irradiating with visible polychromatic light comprises means for irradiating said front surface with diffuse visible polychromatic light having a wide range of angles.

5. The apparatus as defined in claim 4, wherein said means for irradiating with diffuse visible polychromatic light comprises:
   a source for generating visible polychromatic light;
   means for scattering said visible polychromatic light at a wide range of angles so as to produce diffuse visible polychromatic light; and
   means for directing said diffuse visible polychromatic light onto said front surface of said layer of material.

6. The apparatus as defined in claim 5, wherein said source for generating visible polychromatic light comprises:
   a halogen lamp; and
   a fiber optic light guide.

7. The apparatus as defined in claim 5, wherein said means for scattering comprises a ground glass screen.

8. The apparatus as defined in claim 5, wherein said means for directing comprises:
   a condenser lens for producing a diverging diffuse visible polychromatic light beam; and
   a thin plate beam splitter for directing said diverging diffuse visible polychromatic light beam toward said front surface of said layer of material.

9. The apparatus as defined in claim 8, wherein said means for directing further comprises a collimator lens for collimating said diverging diffuse visible polychromatic light beam and projecting a collimated diffuse visible polychromatic light beam onto said front surface of said layer of material.

10. The apparatus as defined in claim 8, wherein said means for directing further comprises a reflective parabolic collimator for collimating said diverging diffuse visible polychromatic light beam and reflecting a collimated diffuse visible polychromatic light beam onto said front surface of said layer of material.

11. The apparatus as defined in claim 8, wherein said layer of material is deformed into a reflective condenser by a vacuum chuck so as to reflect said diverging diffuse visible polychromatic light beam back toward said thin plate beam splitter.

12. The apparatus as defined in claim 1, wherein said means for filtering comprises a means for filtering reflected diffuse visible polychromatic light.

13. The apparatus as defined in claim 12, wherein said means for filtering reflected diffuse visible polychromatic light comprises:
   a spatial filter for filtering said reflected diffuse visible polychromatic light so as to produce a spatially filtered visible polychromatic light beam; and
   means for spectrally filtering said spatially filtered visible polychromatic light beam so as to produce spatially filtered visible monochromatic light having characteristics that correspond to the thickness of said layer of material.

14. The apparatus as defined in claim 13, wherein said spatial filter produces a collimated spatially filtered visible polychromatic light beam.

15. The apparatus as defined in claim 13, wherein said means for spectrally filtering comprises:
a plurality of narrow band filters for passing different wavelengths of visible light; and
means for sequentially placing said plurality of narrow band filters one at a time into said spatially filtered visible polychromatic light beam to form a spatially filtered visible monochromatic light beam.

16. The apparatus as defined in claim 15, wherein said means for sequentially placing said plurality of narrow band filters one at a time into said spatially filtered visible polychromatic light beam forms a collimated spatially filtered visible monochromatic light beam.

17. The apparatus as defined in claim 15, wherein said means for sequentially placing said narrow band filters comprises a rotatable filter wheel assembly.

18. The apparatus as defined in claim 17, additionally comprising electronic sensors associated with said rotatable filter wheel assembly for providing electrical outputs that are indicative of a rotation of said filter wheel and a period of each said narrow band filter.

19. The apparatus as defined in claim 1, wherein said means for receiving said reflected radiation and for detecting said characteristics comprises a charge coupled device.

20. The apparatus as defined in claim 1, wherein said set of reference characteristics used in said means for comparing said detected characteristics is computed based on predetermined thicknesses and assumed optical properties of said material of said layer.

21. The apparatus as defined in claim 20, wherein said means for comparing includes a computer having said set of reference characteristics stored therein.

22. The apparatus as defined in claim 1, wherein said set of reference characteristics used in said means for comparing said detected characteristics is obtained by storing characteristics derived from a layer of material having a plurality of known thicknesses.

23. The apparatus as defined in claim 22, wherein said means for comparing comprises a computer having said set of reference characteristics stored therein.

24. The apparatus as defined in claim 1, wherein said layer of material is one of a plurality of thin film layers formed on a substrate.

25. The apparatus as defined in claim 24, wherein said other thin film layers have properties that allow radiation to be transmitted, wherein said substrate has a property that allows radiation to be reflected, and wherein said radiation is reflected from said front and rear surfaces of said layer of material, from front and rear surfaces of said other thin film layers, and from a front surface of said substrate.

26. The apparatus as defined in claim 25, wherein said material of said layer to be measured comprises silicon and said substrate comprises silicon.

27. The apparatus as defined in claim 1, wherein said characteristics comprise a plurality of wavelength dependent interference fringe patterns.

28. The apparatus as defined in claim 1, wherein said front surface of said layer of material comprises a full aperture surface area of said front surface of said layer of material, wherein said means for irradiating said front surface irradiates said full aperture surface area with a single beam of polychromatic radiation, wherein said means for filtering said reflected polychromatic radiation comprises means for filtering said polychromatic radiation reflected from said full aperture surface area, wherein said means for receiving said filtered monochromatic radiation and for detecting said characteristics comprises means for receiving and detecting said characteristics from said filtered monochromatic radiation from said full aperture surface area, and wherein said means for comparing provides an output that corresponds to a thickness map of said full aperture surface area.

29. The apparatus as defined in claim 28, wherein said layer of material is a layer on a front surface of a wafer.

30. The apparatus as defined in claim 29, wherein said means for irradiating comprises:
a source for generating visible polychromatic light;
means for scattering said visible polychromatic light into a diffuse visible polychromatic light beam; and
means for directing said diffuse visible polychromatic light beam onto a full aperture surface area of said front surface of said wafer.

31. The apparatus as defined in claim 29, wherein said means for filtering said reflected polychromatic radiation comprises:
a spatial filter for spatially filtering said reflected polychromatic radiation and for producing a spatially filtered polychromatic radiation; and
a spectral filter for passing only a single wavelength of said spatially filtered polychromatic radiation and producing a spatially filtered monochromatic radiation.

32. The apparatus as defined in claim 29, wherein said means for receiving said reflected radiation and for detecting said characteristics comprises:
a charge coupled device camera detector array for displaying said characteristics contained in said filtered monochromatic radiation; and
a charge coupled device camera for capturing said characteristics displayed on said charge coupled device camera detector array.

33. The apparatus as defined in claim 32, wherein said means for comparing said detected characteristics comprises:
means for digitizing an output signal of said charge coupled device camera; and
means for comparing said digitized output signal with a set of digitized signals corresponding to said reference characteristics.

34. The apparatus as defined in claim 29, wherein said characteristics corresponding to the thickness of said layer of material comprise a plurality of interference fringe pattern images contained in said polychromatic radiation reflected from said full aperture surface area of said front surface of said wafer, and wherein said means for receiving said filtered monochromatic radiation comprises a charge coupled device camera for capturing each of said plurality of interference fringe pattern images.

35. The apparatus as defined in claim 34, wherein said charge coupled device camera captures each of said plurality of interference fringe pattern images from said filtered monochromatic radiation at different wavelengths.

36. The apparatus as defined in claim 34, additionally comprising means placed along the same plane as said front surface of said wafer, wherein said means reflect radiation for alignment purposes and for establishing a reflectance standard.

37. The apparatus as defined in claim 36, wherein said means for comparing said detected characteristics of said received filtered monochromatic radiation comprises a calibration wafer, wherein a layer of material is formed on a front surface of said calibration wafer, wherein said layer of material has a plurality of different known thicknesses over said front surface, and wherein said plurality of different known thicknesses are measured and stored as said set of reference characteristics.

38. The apparatus as defined in claim 36, wherein the set of reference characteristics used in said means for comparing is computed based on predetermined thicknesses and assumed properties of said layer of material and said wafer.

39. A method for measuring the thickness of a layer of material, said method comprising the steps of:
providing a layer of material having a front and a rear surface, said material of said layer having a property that allows radiation to be transmitted therethrough;
irradiating said front surface of said layer of material with polychromatic radiation, wherein said polychromatic radiation is reflected from said front and rear surfaces of said layer of material having characteristics corresponding to the thickness of said layer of material;
filtering said reflected polychromatic radiation so as to produce monochromatic radiation having characteristics corresponding to the thickness of said layer of material;
receiving said filtered monochromatic radiation;
detecting said characteristics of said received filtered monochromatic radiation;
comparing said detected characteristics of said received filtered monochromatic radiation with a set of reference characteristics corresponding to known thicknesses; and
providing an output corresponding to the thickness of said layer of material based on said comparison of said detected characteristics with said set of reference characteristics.

40. The method as defined in claim 39, wherein said step of irradiating comprises the step of irradiating said front surface with diffuse polychromatic radiation of differing wavelengths, such that ambiguities, arising when the phase thickness of said layer of material is a multiple of one of said differing wavelengths, are eliminated.

41. The method as defined in claim 40, wherein said step of irradiating includes the steps of
generating a beam of visible polychromatic light;
scattering said beam of visible polychromatic light so as to produce a beam of diffuse visible polychromatic light; and
directing said beam of diffuse visible polychromatic light onto said front surface.

42. The method as defined in claim 39, additionally comprising the step of computing said set of reference characteristics based on predetermined thicknesses and assumed optical properties of said layer of material, and storing said set of reference characteristics.

43. The method as defined in claim 39, additionally comprising the steps of:
providing a reference layer of material having areas of known thickness;
measuring said thickness characteristics of said reference layer of material in said areas known thickness; and
storing said measured thickness characteristics as said set of reference characteristics.

44. The method as defined in claim 39, wherein said step of irradiating includes the step of simultaneously irradiating the entire front surface of said layer of material with a single beam of diffuse polychromatic radiation, and wherein said step of providing an output comprises the step of providing an output corresponding to a thickness map of said entire front surface of said layer of material.

45. The method as defined in claim 39, wherein said step of filtering includes the steps of:
spatially filtering said reflected polychromatic radiation so as to produce a beam of spatially filtered polychromatic radiation having characteristics corresponding to the thickness of said layer of material; and
spectrally filtering said beam of spatially filtered polychromatic radiation so as to produce a beam of spatially filtered monochromatic radiation having characteristics corresponding to the thickness of said layer of material.

46. The method as defined in claim 39, wherein said step of detecting said characteristics comprises detecting said characteristics using a charge coupled device camera, wherein said camera provides output signals that correspond to said characteristics, and wherein said method includes the additional steps of:
digitizing said output signals provided by said charge coupled device camera; and
comparing said digitized output signals with a set of digitized reference signals that correspond to said set of reference characteristics.

47. The method as defined in claim 46, wherein said detected characteristics are a plurality of interference fringe pattern images produced by coherent interactions in said polychromatic radiation as it is reflected within said deformed layer of material, wherein said plurality of interference fringe pattern images are contained in said reflected polychromatic radiation, and wherein said charge coupled device camera captures each of said plurality of interference fringe pattern images at a plurality of different points to determine the thickness of said layer of material at said plurality of different points.

48. The method as defined in claim 39, additionally comprising the steps of:
performing a chemical micropolishing process upon said front surface of said layer of material in accordance with said output corresponding to the thickness of said layer of material; and
repeating the above mentioned steps sequentially until the thickness of said layer of material corresponds to a predetermined thickness.

* * * * *